United States Patent [19]

Ishido et al.

[11] Patent Number: 4,971,429
[45] Date of Patent: Nov. 20, 1990

[54] FIXED FOCUS AND FIXED PUPILAR DISTANCE BINOCULAR WITH HEAD BAND

[76] Inventors: Shinsuke Ishido, 16-16, Yayoigaokacho, Takatsuki-Shi, Osaka; Maruyama Kazuhiro, 1251, Maeda, Hatogaya-Shi, Saitama, both of Japan

[21] Appl. No.: 473,828

[22] Filed: Feb. 2, 1990

[30] Foreign Application Priority Data

Nov. 7, 1989 [JP] Japan .................................. 1-129781

[51] Int. Cl.⁵ ...................... G02B 23/18; G02B 23/02
[52] U.S. Cl. ..................................... 350/547; 350/145
[58] Field of Search ............... 350/547, 548, 545, 146, 350/145, 589, 590

[56] References Cited

U.S. PATENT DOCUMENTS

| 1,811,614 | 6/1931 | Cover | 350/548 |
| 2,848,924 | 8/1958 | Poetz | 350/146 |
| 3,787,688 | 1/1974 | Stone | 350/146 |

FOREIGN PATENT DOCUMENTS

| 2012488 | 10/1971 | Fed. Rep. of Germany | 350/547 |
| 154928 | 1/1922 | United Kingdom | 350/547 |

Primary Examiner—Jon W. Henry
Attorney, Agent, or Firm—Fred Philpitt

[57] ABSTRACT

The binocular is constructed in such a way that a lens assembly is provided in which a prism, eyepiece lens cylinder and an object lens cylinder are assembled and installed in a condition that a pupilar distance and a focus are set at a constant, and a casing is provided in which the lends assembly is housed, and the casing is provided with an eyecup edge portion curved to a shape fitting a skeleton around eyes of a user at an eyepiece side, and a band mounting portion is provided at a right and left and of the eyecup edge portion, and the casing is formed by a partition plate provided at the eyepiece side and a transparent hood provided at an object side, and the lens assembly is housed in the casing surrounded by the partition plate and the transparent hood, and the partition plate is bored with two through holes, and the eyepiece lens cylinder is inserted into the through hole so that the eyepiece lens is positioned to keep a fixed distance from the eyecup edge portion, and the lens assembly is fixed and supported in the casing, and a head portion stationary band is provided at the band mounting portions of the casing to support the casing on the head of the user.

1 Claim, 5 Drawing Sheets

FIXED FOCUS AND FIXED PUPILAR DISTANCE BINOCULAR WITH HEAD BAND

BACKGROUND OF THE INVENTION

This invention relates to a binocular for use by being supported on a head of a user by means of a band, and more particularly to a binocular comprising a lens assembly prepared by integral molding of right and left body tubes, a casing having an eyecup edge portion curved to a shape fit to a skeleton around of user's eyes at eyepiece side and having a band mounting portion at right and left ends of the eyecup edge portion and the lens assembly being housed in the casing, a partition plate provided at the eyepiece side of the casing to keep eyepiece lens at a fixed distance from the eyecup edge portion of the casing by mounting an eyepiece lens cylinder of the lens assembly and fixing and supporting the lens assembly inside of the casing, eyecups installed in the eyepiece lens cylinders and fixing the lens assembly to the partition plate, a transparent hood installed at an object side of the casing, and a head portion stationary band provided at the band mounting portion.

Heretofore, the binocular is composed of a pupilar distance adjusting mechanism in which right and left body tubes are turned by means of a center shaft and a focus adjusting mechanism for expanding and contracting an object lens by turning a focus adjusting knob, and when the binocular is used, the binocular is held by hand, and in the first place, a pupilar distance is adjusted while turning the right and left body tubes, and then, the focus adjusting knob is turned to focus it on an object to be observed and the focusing operation is repeated until a clear view is obtained, which has been well known among the general public.

Furthermore, it has been well known that as a binocular having a fixed pupilar distance, a binocular having small magnification such as opera glasses and the like.

Also, the binocular is regarded as having difficulty in the manipulation of focus adjustment and as a result, in recent years, binoculars whose focus is fixed are offered to the users who are not accustomed to the handling of the binoculars.

However, the binoculars of this kind were handled using both hands. Namely, one hand was used to fit the binocular to both eyes while supporting it, and the other hand was used to make a focus adjustment for the purpose of continual observation, and in the meantime, the binocular had to be supported by the hands which resulted in the fatigues. The observation of long hours by using the binocular was frequently considered as suffering on the part of the user. Also, the hand could not be utilized for other things since the binocular had to be supported by both hands while the observation was made with the binocular.

Furthermore, the eyecup installed on the eyepiece lens cylinder was formed in almost same diameter with an aperture of the eyepiece lens cylinder and thus, the eyecup became small, and the sight was deteriorated due to the pressing of the eyelid with the eyecup, and also, the viewing became poor owing to the increased incident light which resulted in inherent insufficient function of the binocular, and was difficult to see an object and to use for those who were not accustomed to using the binoculars which had been drawbacks.

SUMMARY OF THE INVENTION

An object of this invention is to provide a binocular in which a lens assembly having incorporated the lenses is housed in a casing, and this casing is fixed and maintained at a distance copying after both eyes by supporting this casing on the head of a user by means of a band so that both hands can be set in free condition.

Another object of this invention is to provide a binocular that can be supported by the head of a user by means of a band by reducing a weight of the lens assembly having incorporated the lenses to a minimum.

A further object of this invention is to provide a binocular that allows the user to make an observation by supporting the binocular on the head of the user and by fitting it to the eyes which has a structure of fixed pupilar distance and a fixed focus.

A still further object of this invention is to provide a binocular in which an eyecup edge portion having a broader aperture fitting to a skeleton around both eyes is formed at an eyepiece side of a casing, and a fixed distance is retained between the lens and the eyes, and the entering of light into the eyecup is prevented' and the eyecup holds down the eyelid resulting in that the deterioration of the sight is eliminated and the cause of difficulty of viewing due to the entering of light is removed thereby making it easy to handle.

DETAILED DESCRIPTION OF THE INVENTION

Figure 12A:
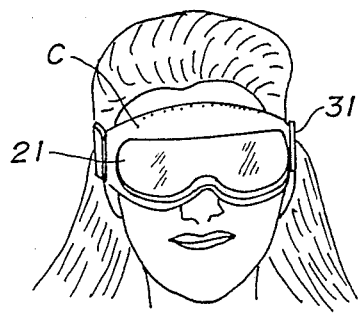
FIG. 12 is a drawing showing the condition of use of (a) and (b).
Figure 12B:
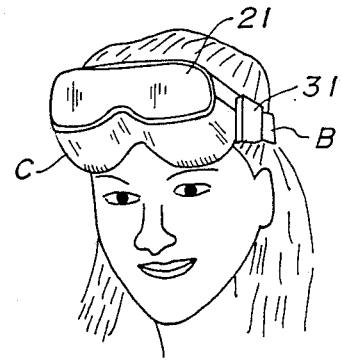

In FIG. 1, FIG. 2, FIG. 7 and FIG. 8, a binocular is formed in which a lens assembly M is housed in a casing C that is supported through its tightening by the user's head as shown in FIG. 12 (a) (b) by means of a band B.

The lens assembly is constructed in such a way as shown in FIG. 3 through FIG. 6 that a pupilar distance is fixed by providing a recess portion 3 provided with a knob 2 in the center of the front surface by integrating body tubes 1 of right and left sides, and a seat portion 7 bored with three pieces of through holes 4, 5, 6 for guiding beams of light is integrally formed on the right and left body tubes 1, and prisms 8, 9 are assembled on the seat portion 7 by means of the through holes 4, 5, 6 of the beam of light of the right and left body tubes 1, and in the upper side of the seat portion 7, a semicircular cylinder frame 11 for installing an eyepiece lens cylinder 10 is integrally formed on the right and left body tubes 1, and in the lower side of the seat portion 7, a pair of arc shaped frames 13, 13' for installing an object lens cylinder 12 is integrally formed on the right and left body tubes 1 by surrounding the through holes 6, and the eyepiece lens cylinder 10 and the object lens cylinder 12 are installed on the semicircular cylindrical frame 11 and the arc-shaped frames 13, 13' to be integrally incorporated into the lens assembly M, and a cover plate 14 is provided on the upper surface of the right and left body tubes 11 at the eyepiece side of the lens assembly M, and the eyepiece lens cylinder 10 is caused to project from the cover plate 14, and the focus adjusting shaft 16 from the cover plate 14 to fix a focus adjusting shaft 16 whereby the focus is set to be constant.

The lens assembly M has a magnification of 4~8 times, and it is preferable to set the focus adjusted to an infinite according to the respective magnifications.

Figure 1:
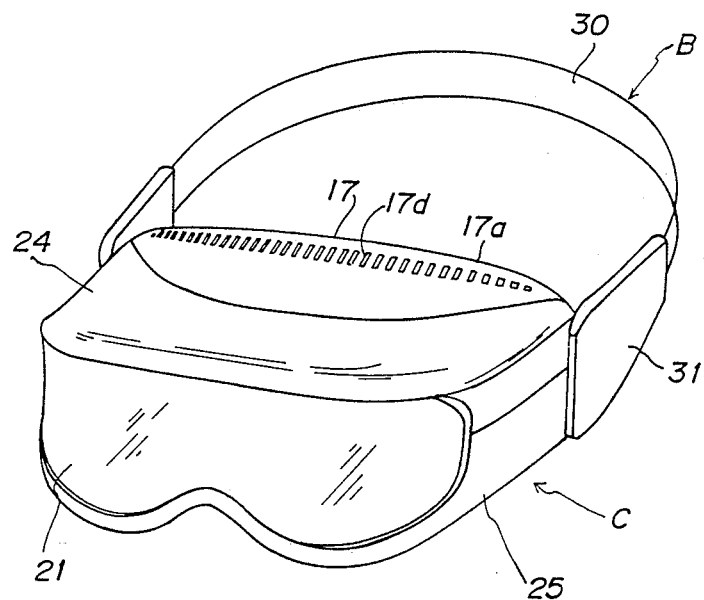
FIG. 1 is a perspective view of an entire binocular.
Figure 2:
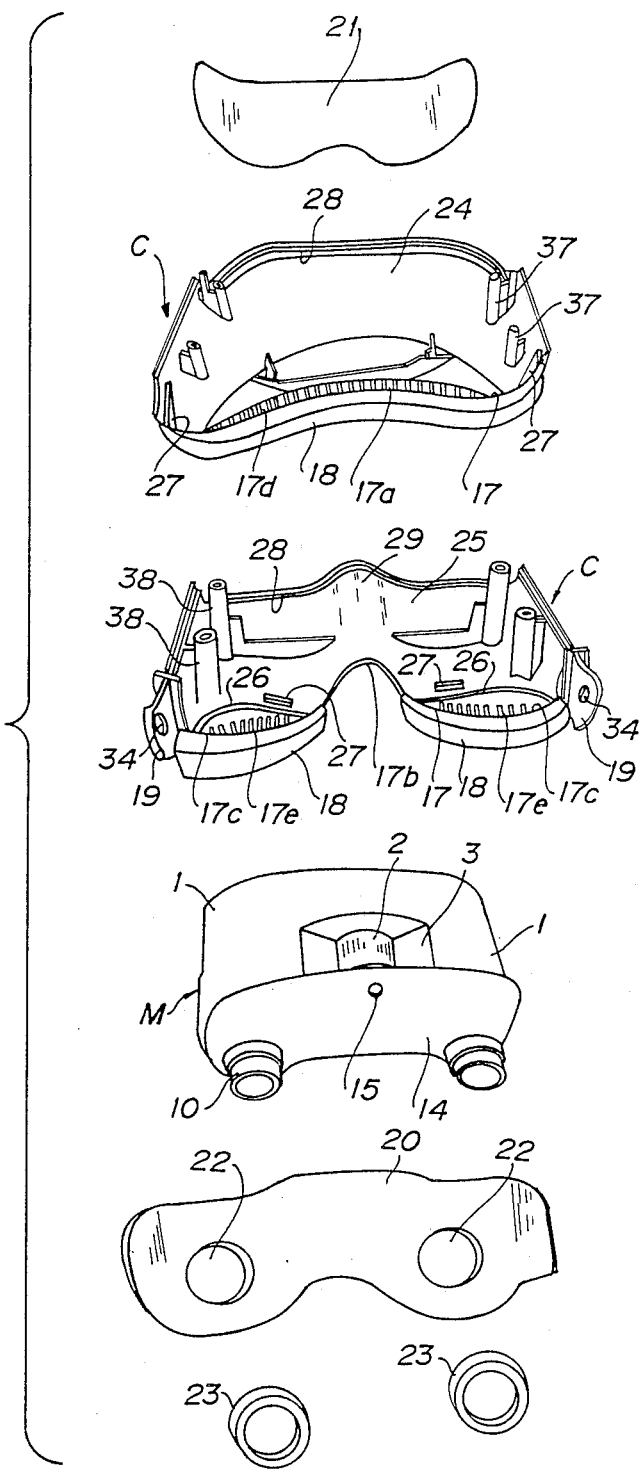
FIG. 2 is its decomposed perspective view.
Figure 3:
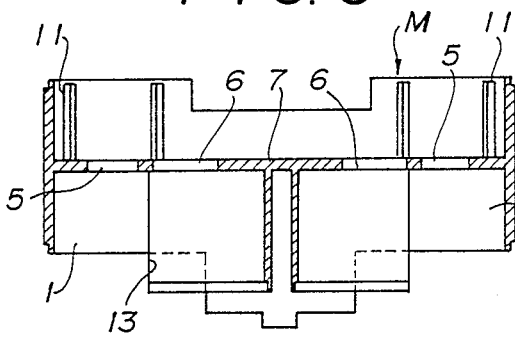
FIG. 3 is a vertical plan of a lens assembly.
Figure 4:
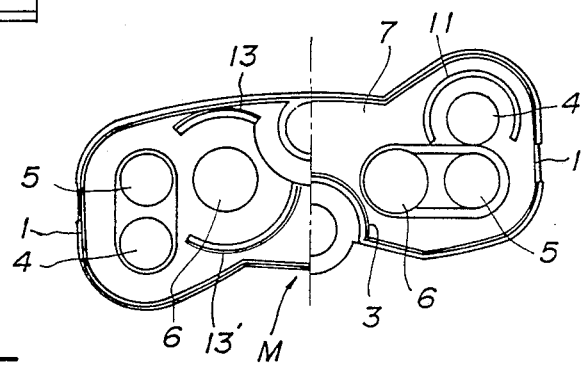
FIG. 4 is a left side bottom view and right side plan showing a seat portion by dividing the lens assembly with a center line.
Figure 5:
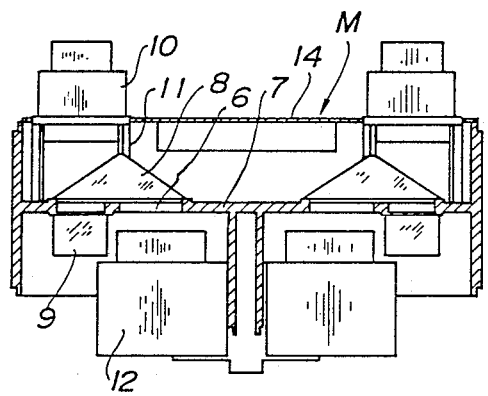
FIG. 5 is a vertical plan showing an assembled lens tube and prism.
Figure 6:
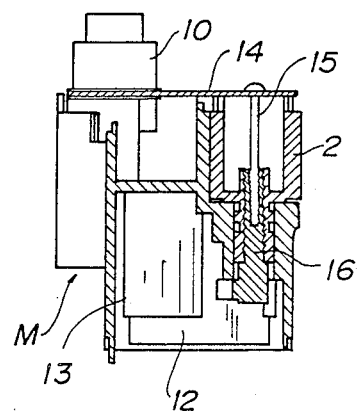
FIG. 6 is a vertical side view showing an assembled lens tube and prism.
Figure 7:
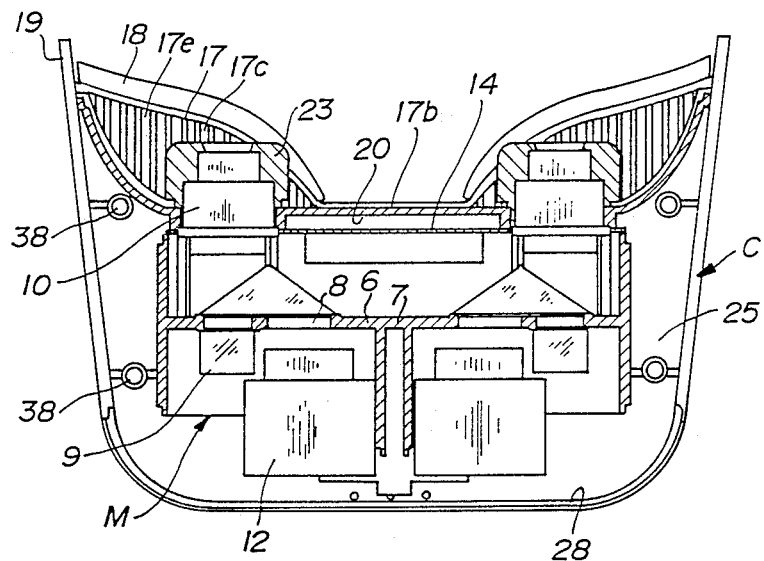
FIG. 7 is a plan of an assembled condition showing an upper cover portion being removed.
Figure 8:
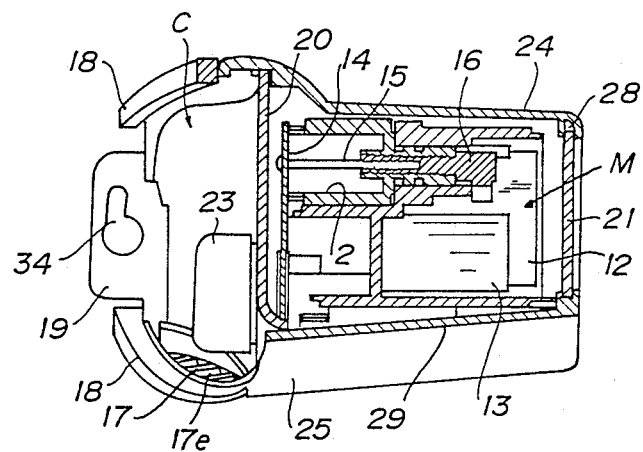
FIG. 8 is a vertical side view of the assembled condition.

As shown in FIG. 2, FIG. 7 and FIG. 8, the casing C is constructed in such a way that an eyecup edge portion 17 that is curved to copying after an unevenness of skeleton around eyes of a user, namely, forehead portion, nose and cheekbones is provided on a peripheral edge portion at the eyepiece side, and beltlike cushion member 18 is provided along the eyecup edge portion 17 and the eyecup edge portion 17 optimumly fits the profile of the face of the user, and a band mounting portion 19 is integrally formed at both sides of the eyecup edge portion 17. A partition plate 20 is provided at a position having a predetermined depth distance from the eyecup edge portion 17 which is at the eyepiece side of the casing C, and a transparent hood 21 is provided at an object side, and the lens assembly M is stored in the casing C surrounded by the partition plate 20 and the transparent hood 21. The partition plate 20 is bored with two pieces of through holes 22 and the eyepiece lens cylinder 10 is inserted into the through hole 22, and an eyecup 23 is provided on the eyepiece lens cylinder 10, whereby the lens assembly M is fixed and supported on the casing C by means of the partition plate 20, and the eyecup 23 provided on the eyepiece lens cylinder 10 is fixed and supported at a position keeping a predetermined distance from the eyecup portion 17 of the casing C.

The casing C is composed of an upper cover portion 24 and a lower cover portion 25, and these upper and lower cover portions 24 and 25 are provided with a rib 26 and a set member 27 for engaging and clipping the partition plate 20 at a predetermined depth position from the eyecup edge portion 17 at the eyepiece side, and a rib 28 for engaging the transparent hood 21 is provided on a peripheral edge at the object side, and a curved portion 17a copying after a skeleton of a forehead portion of the user is provided at the eyepiece side of the upper cover, and a recess portion 17b is formed at the eyepiece side of the lower cover portion 25 so that the load is not exerted on the nose of the user, and curved portions 17c, 17c copying after cheekbones of the user are provided at the right and left of the recess portion 17b, and the eyecup edge portion 17 is formed by these curved portions 17a, 17b, 17c, and a buldged portion 29 of a direction of central length for partitioning and positioning the right and left body tubes of the lens assembly M is provided on the lower cover portion 25, and the lens assembly M. partition plate 20 and the transparent hood 21 are installed at the respective positions, and boss 26 and a boss receptor 27 provided on the upper and lower cover portions 24, 25 are superposed and screwed whereby the lens assembly M is fixed in the casing C and thus, the assembly is completed.

Furthermore, ventilation holes 17d, 17e for preventing a blur on the lens are bored through at the eye piece side of the upper and lower cover portions 24, 25.

Figure 9:
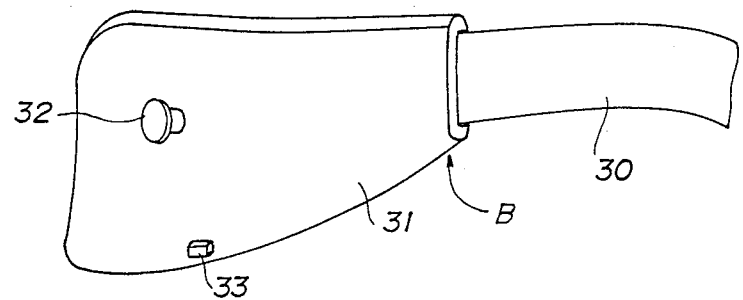
FIG. 9 is a perspective view of a connecting portion of a stationary band.
Figure 10:
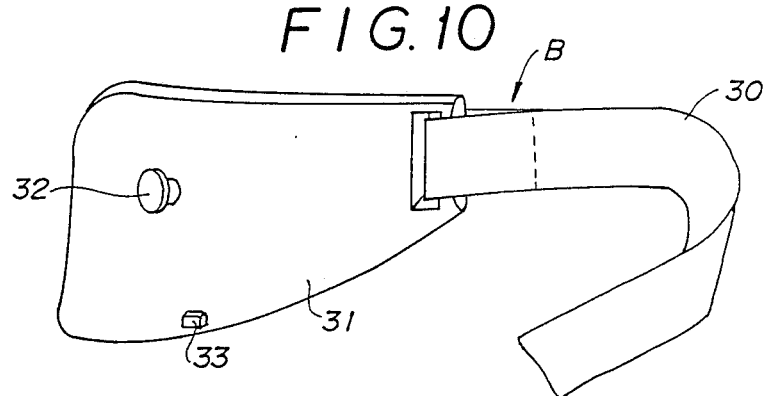
FIG. 10 is a perspective view of a connecting portion when a rubber band is employed.
Figure 11:
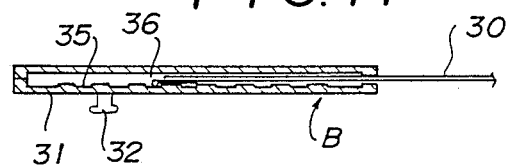
FIG. 11 is a vertical cross section of the connecting portion of FIG. 9.

The stationary band B. as shown in FIG. 9, is provided with a connecting plate 3i at both ends of a band portion 30 made of metal belt, and the connecting plate 31 is provided with an engaging pin 32 and a projecting pin 33 at a predetermined distance from the engaging pin, and the engaging pin 82 is rotatably installed in an engaging hole 34 of the band mounting portion 19 of the casing C, and thus, a turning range of the connecting plate 31 is controlled by the projecting pin 33. The connecting plate 31, as shown in FIG. 11, a rack portion 35 is provided in its inside, and the band portion 30 is formed to be expandable by resiliently engaging an engaging member 36 provided at the tip of the band portion 30 on the rack portion 35. Also, in lieu of the metal band, as shown in FIG. 10, a rubber band B may be used.

By the way, the lens assembly M, casing C, partition plate 20 and the transparent hood 21 may be integrally molded using the synthetic resin material, and the lens assembly M is formed in a total weight of the lens assembly M housed in the casing is about 220 grams or lighter weight, and it is preferable to manufacture it in light weight which does not render a feeling of weight on the head or the face of the user when using it.

Accordingly, a binocular is provided which is of a fixed pupilar distance and a fixed focus structure with right and left body tubes being integrally formed and being placed on the head of the user by means of the band. Namely, the lens assembly is positively and firmly supported and housed in the casing by means of the partition plate and the eyecup, and the lens assembly prepared by integrally molding the right and left body tubes has a fixed pupilar distance, and the eyepiece lens cylinder is housed in the casing and is positioned inside from the eyecup edge portion of the casing so that the vision adjustment is not needed, and the focus is fixed so that an object can be easily and immediately caught without any manipulation but merely causing the eyecup edge portion of the casing to fit on the eyes. Since the eyecup edge portion of the casing is formed unevenly copying after the skeleton around the eyes of the user, the entire eyecup edge portion of the casing fits the skeleton around the eyes of the user, preventing completely the entering of the light into the eyepiece lens, and moreover, the eyepiece lens refrains from applying the pressure to the eyelid so that the sight is not deteriorated and thus, the object can be easily and positively caught which results in a full practice of inherent function of the binocular. Furthermore, when a pupilar distance is set an average distance value, the setting is suitable for any users whose pupilar distance is in the average pupilar distance. Under the circumstances, the binocular is in use by fitting it on the head of the user by means of the band. This stationary band is of a structure of turing at the mounting portion so that the manipulation of fitting or removing the binocular on the eyes can be carried out easily and thus, a changeover of the observation with naked eyes and of the observation with the binocular can be easily carried out.

Furthermore, even hen the rubber band is used, the removal of the binocular is carried out easily. Therefore, this binocular provides an extremely easiness of viewing for those who are not accustomed to handling of the binocular, and as both hands are in free condition while the observation is made with the binocular, there are advantageous points that the users can enjoy drama in the theater or baseball plays while holding the glass of juice or foodstuff on hands.

What is claimed is:

1. A binocular comprising:
  a lens assembly in which right and left body tubes are integrally formed, and a prism and an eyepiece lens cylinder and an object lens cylinder are assembled in each body tube in such a way that a pupilar distance and a focus are set at a constant,
  a casing in which an eyecup edge portion curved to a shape fitting a skeleton around eyes of a user is provided at an eyepiece side and a band mounting portion is provided at right and left ends of the eyecup edge portion.
  said casing being assembled using a partition plate provided at the eyepiece side and a transparent hood provided at an object side and the lens assembly is housed in the casing surrounded by the partition plate and the transparent hood,
  the partition plate is bored with two through holes and the eyepiece lens cylinder is inserted into the through hole and the eyepiece lens is installed by keeping a fixed distance and the depth from the eyecup edge portion and the lens assembly is fixed and supported in the casing,
  an eyecup disposed in the eyepiece lens cylinder and fixing the lens assembly to the partition plate, and
  a stationary band for head portion of the user which is provided at the band mounting portions.

* * * * *